(12) United States Patent
Sasai

(10) Patent No.: US 8,646,320 B2
(45) Date of Patent: Feb. 11, 2014

(54) FUEL PROPERTY DETERMINING APPARATUS

(75) Inventor: Mie Sasai, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 574 days.

(21) Appl. No.: 12/999,457

(22) PCT Filed: May 1, 2009

(86) PCT No.: PCT/JP2009/058551
§ 371 (c)(1),
(2), (4) Date: Dec. 16, 2010

(87) PCT Pub. No.: WO2010/125688
PCT Pub. Date: Nov. 4, 2010

(65) Prior Publication Data
US 2012/0047992 A1    Mar. 1, 2012

(51) Int. Cl.
*G01M 15/04*    (2006.01)
(52) U.S. Cl.
USPC ............ 73/114.38; 73/35.02; 73/114.53
(58) Field of Classification Search
USPC ............... 73/35.02, 114.38, 114.53
See application file for complete search history.

(56) References Cited

U.S. PATENT DOCUMENTS

| | | | |
|---|---|---|---|
| 5,542,394 A | 8/1996 | Tomisawa | |
| 7,367,223 B2* | 5/2008 | Kettl et al. | 73/53.05 |
| 7,621,174 B2* | 11/2009 | Takaku | 73/114.53 |
| 7,778,763 B2* | 8/2010 | Ueda et al. | 701/104 |
| 8,074,503 B2* | 12/2011 | Tsutsumi et al. | 73/114.38 |
| 8,074,504 B2* | 12/2011 | Suzuki et al. | 73/114.38 |
| 8,214,129 B2* | 7/2012 | Pursifull | 701/103 |
| 8,260,560 B2* | 9/2012 | Yoshikawa et al. | 702/24 |
| 8,281,643 B2* | 10/2012 | Yasuda | 73/35.02 |
| 8,307,695 B2* | 11/2012 | Miyaura et al. | 73/35.02 |
| 8,347,828 B2* | 1/2013 | Yoshida et al. | 123/1 A |
| 2011/0215813 A1* | 9/2011 | Sasai et al. | 324/537 |
| 2012/0103312 A1* | 5/2012 | Sasai et al. | 123/575 |
| 2013/0019669 A1* | 1/2013 | Wakao et al. | 73/114.42 |

FOREIGN PATENT DOCUMENTS

| | | |
|---|---|---|
| JP | A-05-045281 | 2/1993 |
| JP | Y2-05-31245 | 8/1993 |
| JP | Y2-2527324 | 2/1997 |
| JP | A-09-324693 | 12/1997 |
| JP | B2-3057470 | 6/2000 |
| JP | A-2007-239637 | 9/2007 |
| JP | A-2008-014741 | 1/2008 |
| JP | A-2008-157728 | 7/2008 |
| JP | A-2009-068445 | 4/2009 |

OTHER PUBLICATIONS

International Search Report issued in Application No. PCT/JP2009/058551; dated Jul. 28, 2009 (with translation).

* cited by examiner

*Primary Examiner* — Freddie Kirkland, III
(74) *Attorney, Agent, or Firm* — Oliff PLC

(57) ABSTRACT

A fuel property determining apparatus is provided that can reduce power consumption in energization of a fuel property sensor by efficiently determining a fuel property as determined by activating the fuel property sensor. Upon starting an internal combustion engine, it is determined whether or not determination is made of the fuel property in a preceding trip. When the fuel property is determined in the preceding trip, a switch is turned ON to activate the fuel property sensor after waiting for a short period of time after the start of the internal combustion engine. When the fuel property is not determined in the preceding trip, the switch is turned ON to activate the fuel property sensor immediately after the start of the internal combustion engine.

16 Claims, 6 Drawing Sheets

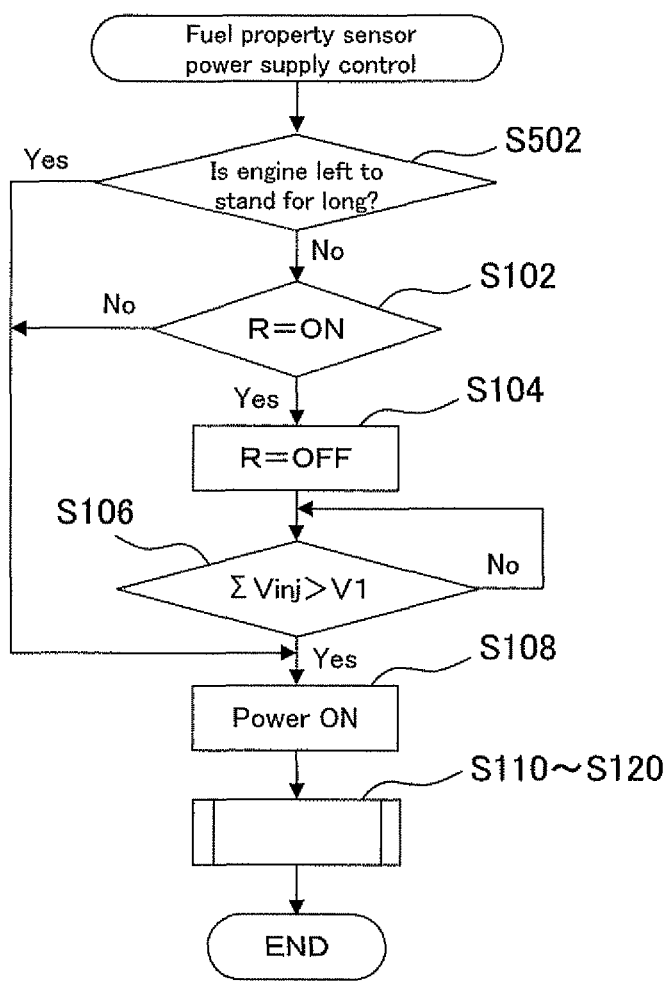

FUEL PROPERTY DETERMINING APPARATUS

TECHNICAL FIELD

The present invention relates to, in a vehicle driven by an internal combustion engine, a fuel property determining apparatus that determines properties of fuel supplied from a fuel tank to the internal combustion engine.

BACKGROUND ART

A known internal combustion engine permits use of a plurality of types of fuels, each having properties different from each other. An example of such an internal combustion engine is one which uses ethanol-blended gasoline. When fuels with properties different from each other are to be used, it becomes necessary to adjust an air-fuel ratio according to the fuel properties. When, for example, the ethanol-blended gasoline is to be used, the air-fuel ratio must be adjusted according to ethanol concentration of the fuel, because ethanol and gasoline have heat values per unit volume that are widely different from each other.

Properties of a fuel used are not necessarily well-known and do not remain constant at all times. Take the ethanol-blended gasoline, for instance, the ethanol-blended gasoline is commercially available in a plurality of types, each having a unique ethanol concentration. A fuel of a first ethanol concentration may therefore be added to a fuel having a second ethanol concentration in the fuel tank. An internal combustion engine, in which a plurality of types of fuels, each having properties different from each other, may be used, therefore needs means of identifying properties of the fuel being used therein.

Fuel property sensors have been used as the abovementioned means. Techniques relating to the fuel property sensors are disclosed in, for example, JP-A-2008-157728 and JP-A-5-045281. The fuel property sensors disclosed in these Patent Documents are an optical type. The fuel property sensors of other types are also known, such as that disclosed, for example, in JP-A-2008-014741. Most of the fuel property sensors include a sensor element and a circuit, though operating on different detecting systems. Electricity must therefore be supplied to operate the fuel property sensors.

Operating the fuel property sensor allows the properties of the fuel used in the internal combustion engine to be determined. Operating the fuel property sensor, however, consumes electric power and, moreover, consumes power that is far from little. In addition, the fuel property sensor is controlled to be activated or deactivated by a vehicle electronic control unit (ECU). This means that the ECU also consumes power while the fuel property sensor is being operated. From a viewpoint of load on the ECU, and from a viewpoint of fuel economy of the vehicle, power consumed to operate each device should preferably be kept to a minimum. The fuel property sensor is not an exception to such a need and there is a need for determining properties of fuels with as small power consumption as possible.

SUMMARY OF THE INVENTION

The present invention has been made to solve the foregoing problems and it is an object of the present invention to provide a fuel property determining apparatus that can reduce power consumption in energization of a fuel property sensor by efficiently determining a fuel property, as determined by activating the fuel property sensor.

The present invention has the following two preferred aspects. In each of the two preferred aspects, a fuel property determining apparatus includes a fuel property sensor, a switch, means for determining a property of fuel supplied to an internal combustion engine based on a signal from the fuel property sensor, and means for storing determination made of the fuel property. The fuel property sensor is disposed on a fuel supply path extending from a fuel tank to the internal combustion engine. The present invention is not concerned with the type of the fuel property sensor, including a detection system employed and a structure thereof. The switch activates or deactivates the fuel property sensor. The switch receives an enable signal for activation and activates the fuel property sensor. The fuel property sensor is operative when activated, thus outputting a signal that varies according to the fuel property.

In a first aspect of the present invention, the fuel property determining apparatus further includes means for determining, at a start of the internal combustion engine, whether or not determination is made of the fuel property in a preceding trip and means for transmitting the enable signal at timing as appropriately judged from the determination made. More specifically, the means for transmitting the enable signal transmits the enable signal after a short period of time that is waited after the start of the internal combustion engine, in a case where it is determined that the determination of the fuel property is made in the preceding trip. This allows power consumption of the fuel property sensor to be reduced for the wait time. The determination of the fuel property made in the preceding trip and stored in memory may be used for calculation of a fuel injection amount for that period of time. When it is determined, on the other hand, that the determination of the fuel property is not made in the preceding trip, the means for transmitting the enable signal transmits the enable signal immediately after the start of the internal combustion engine. Note herein that the phrase "immediately after the start of the internal combustion engine" is only relative to waiting "for a short period of time" and does not mean to specify any specific timing at which to transmit the enable signal. It is nonetheless preferable that the enable signal be transmitted as soon as possible. It is particularly preferable if the timing allows the determination made of the fuel property through activation of the fuel property sensor to be incorporated in the calculation of the fuel injection amount involved in first fuel injection.

In a second aspect of the present invention, the fuel property determining apparatus further includes: means for determining, at a start of the internal combustion engine, whether or not determination is made of the fuel property in a preceding trip; means for transmitting a refueling signal when refueling of the fuel tank is performed and stopping transmitting the refueling signal when the determination of the fuel property is made; and means for transmitting the enable signal at timing as appropriately judged from the determination made and presence or absence of the refueling signal. More specifically, the means for transmitting the enable signal transmits the enable signal immediately after the start of the internal combustion engine when, at the start of the internal combustion engine, the refueling signal is detected, and further only when it is determined that the determination of the fuel property is not made in the preceding trip. When the refueling signal is detected but it is determined that the determination of the fuel property is made in the preceding trip, the means for transmitting the enable signal transmits the enable signal after a short period of time that is waited after the start of the internal combustion engine. This is because of the following reason. Specifically, for a short period of time after the start, old fuel (the same fuel as that used in the preceding trip) left in the fuel supply path is supplied to the internal combustion engine even when refueling of fresh fuel is performed before the start of the internal combustion engine. Additionally, when the refueling signal is not detected at the start of the internal combustion engine, the enable signal is transmitted after waiting for a period of time is waited, over which fuel in the fuel tank reaches a mounting position of the fuel property sensor. If the refueling signal is not detected, it can then be estimated that refueling of fresh fuel is not performed, specifically, the property of fuel in the fuel tank remains unchanged.

In the aspects described above, determination of the fuel property through activation of the fuel property sensor can be efficiently performed in terms of reduction in power consumption. The period of time to be waited for the enable signal to be transmitted can be set as desired. For example, the period of time may be fixed. Preferably, however, the wait time is set so as to be one during which a sum of an amount of fuel consumed in the internal combustion engine reaches a predetermined value after the start of the internal combustion engine. Alternatively, the wait time may be set so as to be a period of time required for fuel in the fuel tank to reach the mounting position of the fuel property sensor after the start of the internal combustion engine.

To achieve further reduction in the power consumption in the aspects described above, preferably determination of the fuel property is terminated and activation of the fuel property sensor is stopped, when there is no change in the signal from the fuel property sensor for a predetermined period of time.

Additionally, in terms of ensuring control accuracy of an air-fuel ratio to be achieved by an accurate determination of the fuel property, the following aspect is even more preferable.

In an even more preferred aspect of the present invention, the fuel property determining apparatus further includes: means for detecting fluctuations in the air-fuel ratio exceeding a permissible range based on a parameter value having a correlation with the air-fuel ratio; and means for transmitting the enable signal when fluctuations in the air-fuel ratio exceeding the permissible range are detected. The parameter value having a correlation with the air-fuel ratio may, for example, be an amount of deviation of a signal from an air-fuel ratio sensor relative to a reference signal, a feedback amount relating to an air-fuel ratio feedback control, or an amount of deviation of actual torque relative to target torque. If the fuel property is not accurately determined, the required fuel injection amount cannot be calculated accurately. As a result, fluctuations occur in the air-fuel ratio. In the even more preferred aspect of the present invention, the enable signal is transmitted when fluctuations in the air-fuel ratio exceeding the permissible range occur and the fuel property sensor is thereby activated. Air-fuel ratio control through accurate determination of the fuel property is thereby ensured.

In another preferred aspect of the present invention, the fuel property determining apparatus further includes: means for measuring a representative temperature that represents temperature of the internal combustion engine; and means for transmitting the enable signal immediately after the start of the internal combustion engine when the representative temperature at the start of the internal combustion engine is equal to, or less than, a predetermined temperature. As the representative temperature, a coolant temperature, an oil temperature, or an outside air temperature may be used. A greater fuel injection amount results when the temperature of the internal combustion engine is low, so that fuel in the supply path is quickly replaced. In another preferred aspect of the present invention, in a cold start, the enable signal is transmitted immediately after the start of the internal combustion engine to thereby activate the fuel property sensor. This allows changes in the fuel property as a result of quick replacement of fuel to be responded to.

In still another preferred aspect of the present invention, the fuel property determining apparatus further includes means for measuring a stationary time of the internal combustion engine since the preceding trip and means for transmitting the enable signal immediately after the start of the internal combustion engine when the stationary time up to a current start exceeds a predetermined time. A long stationary time of the internal combustion engine could result in the fuel property in the fuel tank or the supply path being changed. Especially when a blended fuel, such as an ethanol-blended gasoline, is used, separation can cause concentration to be uneven. In the still another preferred aspect of the present invention, when the internal combustion engine has been stopped for a long period of time, the enable signal is transmitted immediately after the start to activate the fuel property sensor. Changes in the fuel property with time can thereby be responded to.

BRIEF DESCRIPTION OF THE DRAWINGS

FIG. 7 is a flow chart showing a power supply control procedure performed in a fifth embodiment of the present invention.

MODE FOR CARRYING OUT THE INVENTION

First Embodiment

A first embodiment of the present invention will be described below with reference to each of FIGS. 1 through 3.

A fuel property determining apparatus of this embodiment is applied to a flexible-fuel vehicle (FFV), in which a blended fuel of gasoline and ethanol can be used. FIG. 1 is a schematic view showing a configuration of a fuel supply system for such a vehicle.

Figure 1:
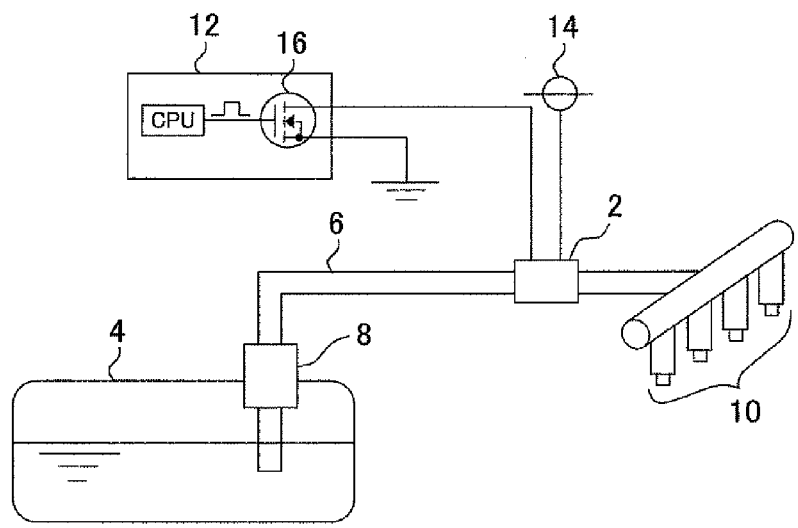
FIG. 1 is a schematic view showing a configuration of a vehicle fuel supply system to which a fuel property determining apparatus as a first embodiment of the present invention is applied.

The fuel supply system shown in FIG. 1 includes a fuel tank 4 that is connected to injectors 10 of an internal combustion engine by a fuel pipe 6. A fuel pump 8 is disposed at an end portion of the fuel pipe 6, which is adjacent to the fuel tank 4. The fuel pump 8 pumps up fuel from the fuel tank 4 and sends the same under pressure to the injectors 10. A fuel property sensor 2 is disposed midway in the fuel pipe 6. An ECU 12 of the vehicle determines a property of the fuel supplied to the injectors 10 based on a signal transmitted from the fuel property sensor 2. A determination made of the property of the fuel is stored in memory in the ECU 12.

The fuel property sensor 2 according to this embodiment is, specifically, an ethanol concentration sensor that outputs a signal that varies according to the ethanol concentration in the fuel. In this embodiment, therefore, the fuel property means the ethanol concentration. The fuel property sensor 2 may be operative on any detecting system; however, the fuel property sensor 2 is formed to include at least a sensor element and a circuit. Thus, to be operative, the fuel property sensor 2 requires a supply of electric power and a dc power supply 14 included in the vehicle performs the function of supplying the power. The ECU 12 controls the supply of the power to the fuel property sensor 2. Specifically, the ECU 12 has a switch 16. By turning ON or OFF the switch 16, the ECU 12 changes an energization state of the fuel property sensor 2. A MOSFET is used for the switch 16. Accordingly, while the fuel property sensor 2 is operated by turning ON the switch 16, not only the dc power supply 14 consumes power, but also the ECU 12 consumes a corresponding amount of power.

Reducing power consumption of the fuel property sensor 2 is advantageous in terms of vehicle fuel economy and load on the ECU 12. The fuel property determining apparatus of this embodiment achieves reduction in power consumption through control logic of the fuel property sensor 2, more specifically, logic of power supply control. A method of power supply control for the fuel property sensor 2 incorporated in the fuel property determining apparatus of this embodiment will be described below.

In this embodiment, the fuel property is determined each time the internal combustion engine is started. Determination of the fuel property becomes necessary after refueling at which the fuel property may change. Refueling is generally performed with the internal combustion engine stopped. To determine reliably the change in the fuel property, therefore, it is desirable that the fuel property be determined each time the internal combustion engine is started. Note, however, that the change in the fuel property caused by refueling cannot necessarily be detected immediately after the start, even if the refueling is performed during the stop. This is because old fuel before the refueling is left inside the fuel pipe 6.

Figure 2:
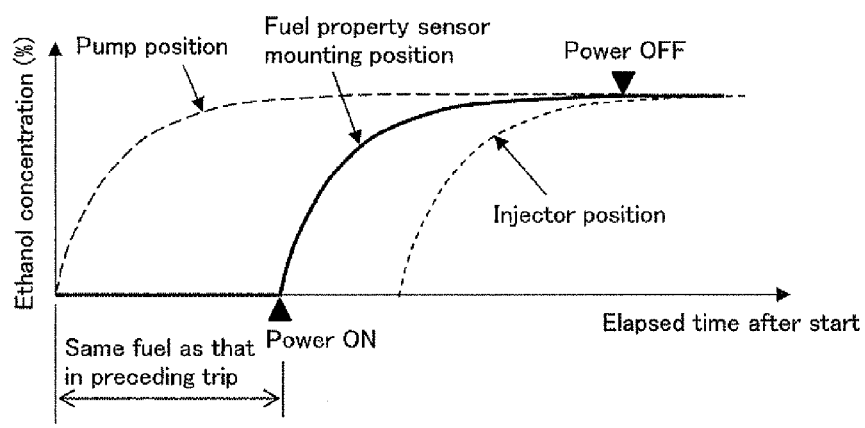
FIG. 2 is a time diagram showing changes in ethanol concentration after refueling at different parts of a fuel supply path.

FIG. 2 is a time diagram showing changes in ethanol concentration after refueling at different parts of a fuel supply path. A broken line indicates a change in the ethanol concentration at an outlet of the fuel pump 8, a solid line indicates a change in the ethanol concentration at a mounting position of the fuel property sensor 2, and a dotted line indicates a change in the ethanol concentration inside the injectors 10. FIG. 2 shows a case in which the ethanol-blended gasoline is added through refueling performed when the internal combustion engine is stationary to the fuel tank 4 that contains only gasoline before the refueling.

As the internal combustion engine is started, the fuel pump 8 is operated. Fuel injection from the injectors 10 is next started, so that fuel in the fuel tank 4 is pumped up into the fuel pipe 6. During the course of these events, the ethanol concentration at the outlet of the fuel pump 8 increases as shown in FIG. 2. When the fuel left in the fuel pipe 6 is eventually replaced totally with fuel newly pumped up, the ethanol concentration becomes constant. By contrast, there is no change in the ethanol concentration at the mounting position of the fuel property sensor 2 and the ethanol concentration inside the injectors 10 for a short period of time after the start of the internal combustion engine as shown in FIG. 2. This is because it takes time for the fuel pumped up by the fuel pump 8 to reach those positions. The time depends on a relationship between a volume of the fuel pipe 6 from the outlet of the fuel pump 8 to each of those positions and a fuel injection amount achieved by the injectors 10.

FIG. 2 tells that there is no need to activate the fuel property sensor 2 to start determining the fuel property immediately after the internal combustion engine is started. For a short period of time after the start, fuel of the same property as that in a preceding trip is supplied to the injectors 10. If the fuel property determined in the preceding trip is stored in memory, an air-fuel ratio control can be performed by using a value of the fuel property stored in memory. It is therefore not too late yet to activate the fuel property sensor 2 and start determining the fuel property even after the fuel pumped up from the fuel tank 4 reaches the mounting position of the fuel property sensor 2. Wait for a short period of time, instead of activating the fuel property sensor 2 immediately after the start, allows power consumption to be reduced just as much as amount consumed for the wait time. The power consumption as the term is herein used includes electric power supplied from the dc power supply 14 and consumed by the fuel property sensor 2 and that consumed by the ECU 12 for keeping the switch 16 in the ON position. The power consumption further includes electric power consumed by the ECU 12 for performing calculations based on the signal transmitted from the fuel property sensor 2.

The wait time may, however, be provided between the start of the internal combustion engine and the activation of the fuel property sensor 2, only when the fuel property is determined in the preceding trip. Determination of the fuel property may be incomplete, if the internal combustion engine is stopped immediately after starting in the preceding trip. In such a case, the fuel property stored in memory at the present moment represents that determined in or before the second preceding trip and not that determined in the preceding trip. If refueling is performed between the second preceding trip and the preceding trip, therefore, the fuel property stored in memory can be different from an actual fuel property of the fuel in the fuel tank 4. If the fuel property is not determined in the preceding trip, therefore, it is desirable that the fuel property sensor 2 be activated and determination of the fuel property be started immediately after the start of the internal combustion engine.

Figure 3:
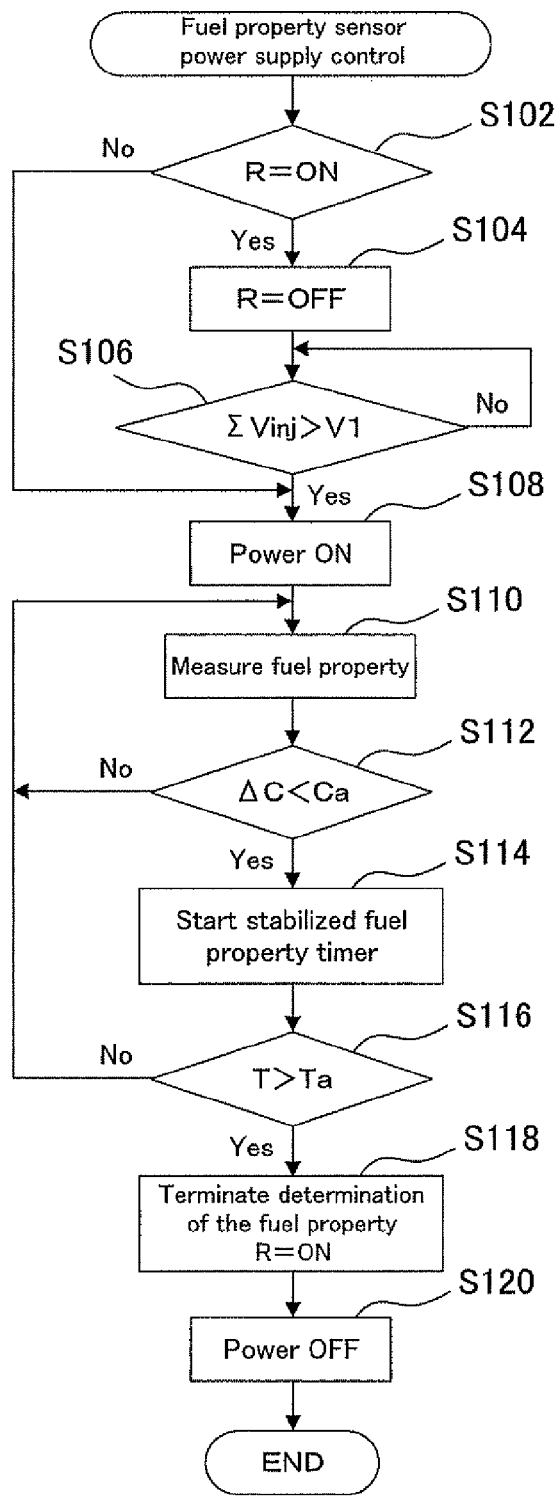
FIG. 3 is a flow chart showing a power supply control procedure performed in the first embodiment of the present invention.

FIG. 3 shows, in a flow chart, a power supply control procedure performed in this embodiment. The procedure shown in this flow chart is performed when the internal combustion engine is started, specifically, when a start switch of the internal combustion engine, for example, an ignition switch is turned ON.

In step S102, the first step, it is determined whether a determination history R of the fuel property in the preceding trip is ON or OFF. The determination history R is ON when the fuel property is determined in the preceding trip, and OFF when the fuel property is not determined. When the determination history R is ON, the determination history R is reset in step S104 and then a determination in step S106 is made. In step S106, a sum $\Sigma V_{inj}$ that is a total fuel injection amount after the start is calculated and compared with a reference value V1. The reference value V1 is the volume of the fuel pipe 6 from the outlet of the fuel pump 8 to the mounting position of the fuel property sensor 2. Specifically, it is determined in step S106 whether or not the fuel pumped up by the fuel pump 8 after the start of the internal combustion engine reaches the fuel property sensor 2. The determination in step S106 is repeatedly made until the sum $\Sigma V_{inj}$ reaches the reference value V1. When the sum $\Sigma V_{inj}$ exceeds the reference value V1, the operation proceeds to step S108 in which the ECU 12 turns ON the switch 16 to activate the fuel property sensor 2 (power ON).

When the determination history R is OFF in step S102, on the other hand, the operation skips steps S104 and S106 to proceed to step S108 in which the fuel property sensor 2 is immediately activated.

After the fuel property sensor 2 is activated, operation of each of steps from step S110 to S120 is performed. Through these steps, the determination of the fuel property is completed and energization of the fuel property sensor 2 is terminated. In step S110, the fuel property (which is herein the ethanol concentration) is measured from the signal from the fuel property sensor 2. In step S112, an output change amount $\Delta C$ that is a difference between a current output value $C_i$ of the fuel property sensor 2 and an output value $\Delta t$ ago $C_{i-1}$ ($\Delta C = C_i - C_{i-1}$) is calculated. $\Delta t$ represents time intervals in which the output from of the fuel property sensor 2 is acquired. The output change amount $\Delta C$ is then compared with a stabilization determination value Ca (e.g. 1%) that serves as a reference for determining whether or not the fuel property is stabilized. Operations of steps S110 and S112 are repeatedly performed until the output change amount $\Delta C$ is smaller than the stabilization determination value Ca.

When the output change amount $\Delta C$ becomes smaller than the stabilization determination value Ca, specifically, when the fuel property is stabilized, the operation proceeds to step S114. In step S114, a stabilized fuel property timer for measuring a duration time T through which the fuel property remains stable, is started. Then in step S116, it is determined whether or not the stabilized fuel property duration time T reaches a stabilization determination value Ta. The stabilization determination value Ta is set to time (e.g. 3 sec.) that suggests good reason to believe that the fuel property is stabilized. The operations of steps from S110 through S116 are repeatedly performed until the stabilized fuel property duration time T exceeds the stabilization determination value Ta.

When the stabilized fuel property duration time T exceeds the stabilization determination value Ta, specifically, when it can be determined that the fuel property is sufficiently stabilized, the operation proceeds to step S118. In step S118, the determination of the fuel property is terminated and the value of the fuel property stored in memory is updated to one determined this time. In addition, the determination history R is turned ON. After the determination of the fuel property is terminated, the operation proceeds to step S120 in which the ECU 12 turns OFF the switch 16 to thereby deactivate the fuel property sensor 2 (power OFF).

The power supply control for the fuel property sensor 2 described heretofore allows determination of the fuel property to be made efficiently by activating the fuel property sensor 2, so that power consumption involved in activating the fuel property sensor 2 can be reduced.

Second Embodiment

A second embodiment of the present invention will be described below with reference to FIG. 4.

A fuel property determining apparatus of this embodiment is applied to the vehicular fuel supply system having the configuration as shown in FIG. 1 as in the first embodiment. The description that follows is, therefore, based on the system shown in FIG. 1 as in the first embodiment.

The fuel property determining apparatus of this embodiment is the same as that of the first embodiment in that power consumption involved in the activation of a fuel property sensor 2 is reduced through power supply control of the fuel property sensor 2. The power supply control of the fuel property sensor 2 employed in this embodiment is, however, characterized in that a refueling history is used as information for determining timing of activation of the fuel property sensor 2. Whether or not the refueling is performed can be determined from a change in a level gauge inside a fuel tank 4. A sensor dedicated to detection of refueling may be disposed at, for example, a filler port.

In the first embodiment, the power supply control for the fuel property sensor 2 is performed on condition that there is likelihood that refueling will be performed when the internal combustion engine is stationary. In reality, however, refueling is not performed each time the internal combustion engine is stopped and, very often, there is no change in the fuel property between the preceding trip and the current trip. If it is known that the fuel property stored in memory at the start of the internal combustion engine coincides with that of fuel left in the fuel pipe 6, there is no need to start determining the fuel property immediately after the start even if the fuel property is not determined in the preceding trip. Specifically, it is necessary to start determining the fuel property immediately after the start, only if the fuel property is not determined in the preceding trip and refueling is performed after the most recent determination of the fuel property. In this case, the fuel property of the fuel left in the fuel pipe 6 is unknown.

Figure 4:
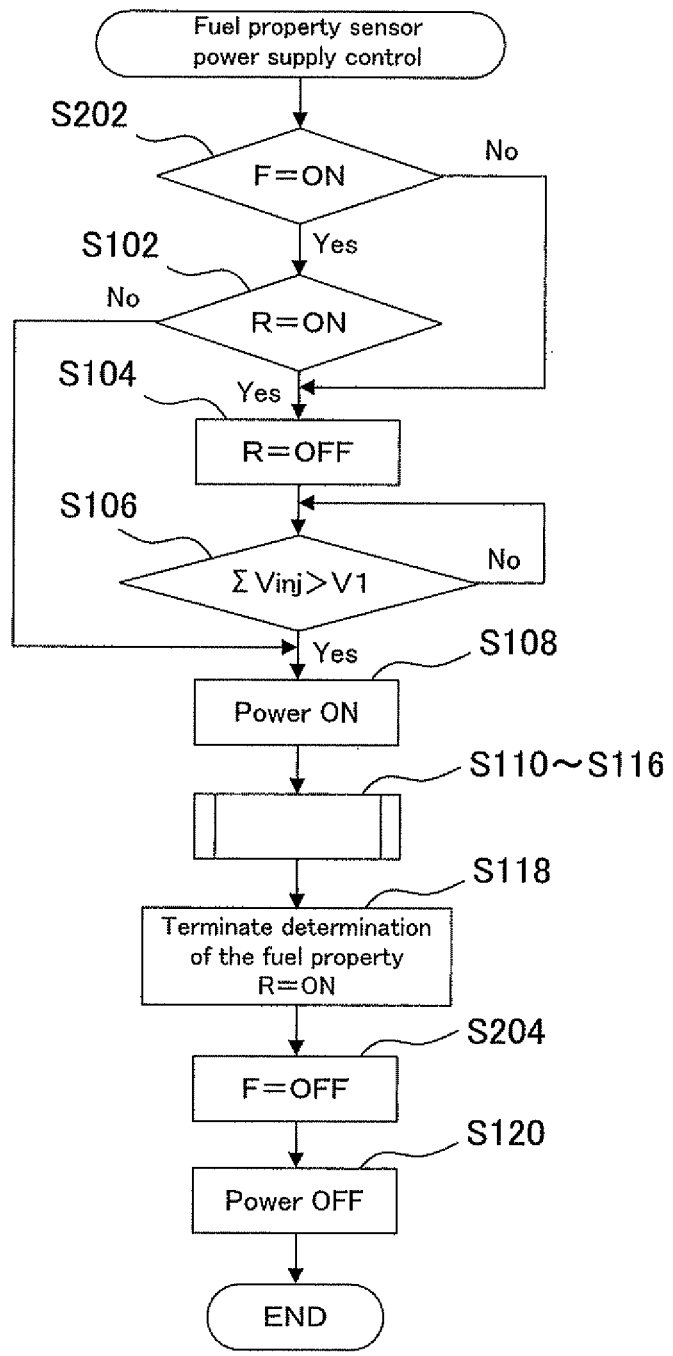
FIG. 4 is a flow chart showing a power supply control procedure performed in a second embodiment of the present invention.

FIG. 4 shows, in a flow chart, a power supply control procedure performed in this embodiment. Of operations shown in this flow chart, those found in common with the first embodiment are identified by like step numbers. The procedure shown in this flow chart is performed when the internal combustion engine is started, specifically, when a start switch of the internal combustion engine, for example, an ignition switch is turned ON.

In step S202, the first step, it is determined whether a refueling flag F is ON or OFF. This flag turns ON if, for example, a sensor physically detects refueling and turns OFF when determination of the fuel property is completed. Consequently, once refueling is performed, the refueling flag F remains ON until the determination is made of the fuel property of fuel after the refueling.

When the refueling flag F is OFF, specifically, no refueling is performed after the most recent determination of the fuel property, the operation proceeds to step S104. The determination history R is then reset before the operation proceeds to step S106 to make a determination. After waiting until the sum $\Sigma$Vinj of the fuel injection amount exceeds the reference value V1, the operation proceeds to step S108 in which the ECU 12 turns ON the switch 16 to thereby activate the fuel property sensor 2. In this case, it can be estimated that no fresh fuel is added, specifically, there is no change in the property of the fuel in the fuel tank 4.

When the refueling flag F is ON, the operation proceeds to step S102 in which it is determined whether the determination history R of the fuel property in the preceding trip is ON or OFF. The refueling flag F is ON and the determination history R is ON, when refueling is performed during a period of time that begins with determination of the fuel property in the preceding trip and ends with the current start. In this case, too, the operation proceeds to step S108 by way of steps S104 and S106. Specifically, after the sum $\Sigma$Vinj of the fuel injection amount exceeds the reference value V1, the ECU 12 turns ON the switch 16 to thereby activate the fuel property sensor 2.

When the refueling flag F is ON and the determination history R is OFF, the property of the fuel left in the fuel pipe 6 is unknown. Consequently, the operation skips steps S104 and S106 to proceed to step S108, in this case, and the fuel property sensor 2 is immediately activated.

After the activation, the operation of each of steps from step S110 to S120 is performed as in the first embodiment. In this embodiment, however, the operation of step S204 is performed after the determination of the fuel property is terminated in step S118. In step S204, the abovementioned refueling flag F is reset. After the refueling flag F is turned OFF, the operation proceeds to step S120 in which the ECU 12 turns OFF the switch 16 to thereby deactivate the fuel property sensor 2.

The power supply control for the fuel property sensor 2 described heretofore allows determination of the fuel property to be made even more efficiently by activating the fuel property sensor 2, so that power consumption involved in activating the fuel property sensor 2 can be further reduced.

Third Embodiment

A third embodiment of the present invention will be described below with reference to FIG. 5.

A fuel property determining apparatus of this embodiment is applied to the vehicular fuel supply system having the configuration as shown in FIG. 1 as in the first embodiment. The description that follows is, therefore, based on the system shown in FIG. 1 as in the first embodiment.

The fuel property determining apparatus of this embodiment is characterized in that the power supply control of a fuel property sensor 2 is performed in terms of ensuring control accuracy of the air-fuel ratio to be achieved by an accurate determination of the fuel property. In the first and second embodiments, the fuel property is determined efficiently by activating the fuel property sensor 2 in terms of reduction in power consumption. The method of power supply control according to these embodiments, however, involves delay in the start of determination of the fuel property in case a specific situation develops. For example, the first embodiment assumes that refueling is performed while the internal combustion engine remains stationary; however, the refueling may be performed without stopping the internal combustion engine. In such a case, even with the fuel property determined in the preceding trip, the determination made previously may not coincide with the actual fuel property. When the fuel property is determined in the preceding trip, the determination of the fuel property is started for a short period of time after the start in the first embodiment. In the power supply control according to this embodiment, however, determination of the fuel property is immediately started as soon as it is found during the wait time that there is a change in the fuel property.

Figure 5:
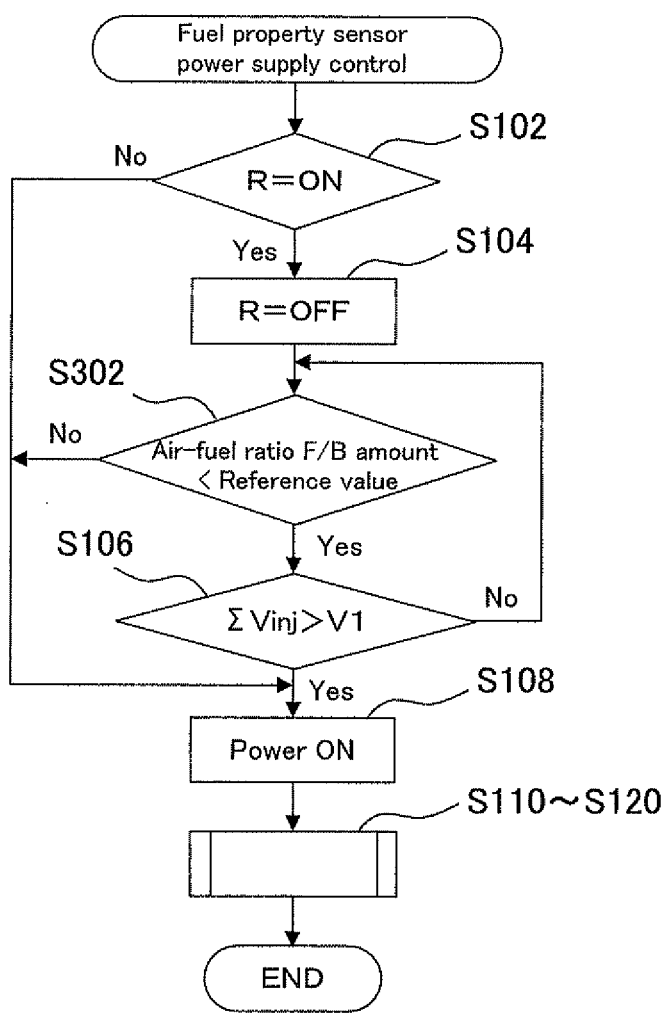
FIG. 5 is a flow chart showing a power supply control procedure performed in a third embodiment of the present invention.

FIG. 5 shows, in a flow chart, a power supply control procedure performed in this embodiment. Of operations shown in this flow chart, those found in common with the first embodiment are identified by like step numbers. The procedure shown in this flow chart is performed when the internal combustion engine is started, specifically, when a start switch of the internal combustion engine, for example, an ignition switch is turned ON.

In step S102, the first step, it is determined whether a determination history R of the fuel property in the preceding trip is ON or OFF. When the determination history R is ON, determination in step S302 and that in step S106 are made. As long as the determination of step S302 is in the affirmative, the determinations in step S302 and step S106 are repeatedly made until the sum $\Sigma Vinj$ reaches the reference value V1. When the sum $\Sigma Vinj$ exceeds the reference value V1, the operation proceeds to step S108 in which the ECU 12 turns ON the switch 16 to thereby deactivate the fuel property sensor 2.

In step S302, it is determined whether or not a feedback amount (F/B amount) in an air-fuel ratio feedback control is less than a reference value. As is well known, in the air-fuel ratio feedback control, the F/B amount is calculated according to a difference between a target air-fuel ratio and an actual air-fuel ratio obtained from a signal from an air-fuel ratio sensor. The fuel injection amount or the target air-fuel ratio is determined according to the fuel property stored in memory. If the stored value is inaccurate, however, the difference between the target air-fuel ratio and the actual air-fuel ratio becomes larger, resulting in a large F/B amount. It can thus be determined that the fuel property is not correctly determined, if the F/B amount is excessively large. When the F/B amount is less than the reference value, the operation proceeds to step S106 as described earlier. If the F/B amount is equal to or more than the reference value, however, the operation exits from a loop to proceed to step S108. Specifically, the fuel property sensor 2 is immediately activated.

After the activation, the operation of each of steps from step S110 to S120 is performed as in the first embodiment.

In the power supply control of the fuel property sensor 2 described above, the fuel property sensor 2 is activated to thereby start determining the fuel property as soon as fluctuations in the air-fuel ratio exceeding a permissible range are detected. This ensures an air-fuel ratio control through accurate determination of the fuel property. This embodiment uses the F/B amount as a basis for determining necessity to start determining the fuel property. Other bases may be used, for example, an amount of deviation of the signal from the air-fuel ratio sensor relative to a reference signal or that of actual torque relative to target torque, as long as such bases represent a correlation with the air-fuel ratio.

Fourth Embodiment

A fourth embodiment of the present invention will be described below with reference to FIG. 6.

A fuel property determining apparatus of this embodiment is applied to the vehicular fuel supply system having the configuration as shown in FIG. 1 as in the first embodiment. The description that follows is, therefore, based on the system shown in FIG. 1 as in the first embodiment.

The fuel property determining apparatus of this embodiment is characterized, as in the third embodiment, in that the power supply control of a fuel property sensor 2 is performed in terms of ensuring control accuracy of the air-fuel ratio to be achieved by an accurate determination of the fuel property. This embodiment, however, focuses on the control accuracy of the air-fuel ratio during a cold start. The fuel injection amount increases during the cold start as compared with a warm start. Thus, the fuel in the fuel pipe 6 is quickly replaced during the cold start. In addition, the cold start is more easily susceptible to the accuracy in determining the fuel property for the increased fuel injection amount. The power supply control of this embodiment therefore gives priority to the control accuracy of the air-fuel ratio over the power consumption and starts determining the fuel property immediately after the start of the internal combustion engine, when the current start is the cold start.

Figure 6:
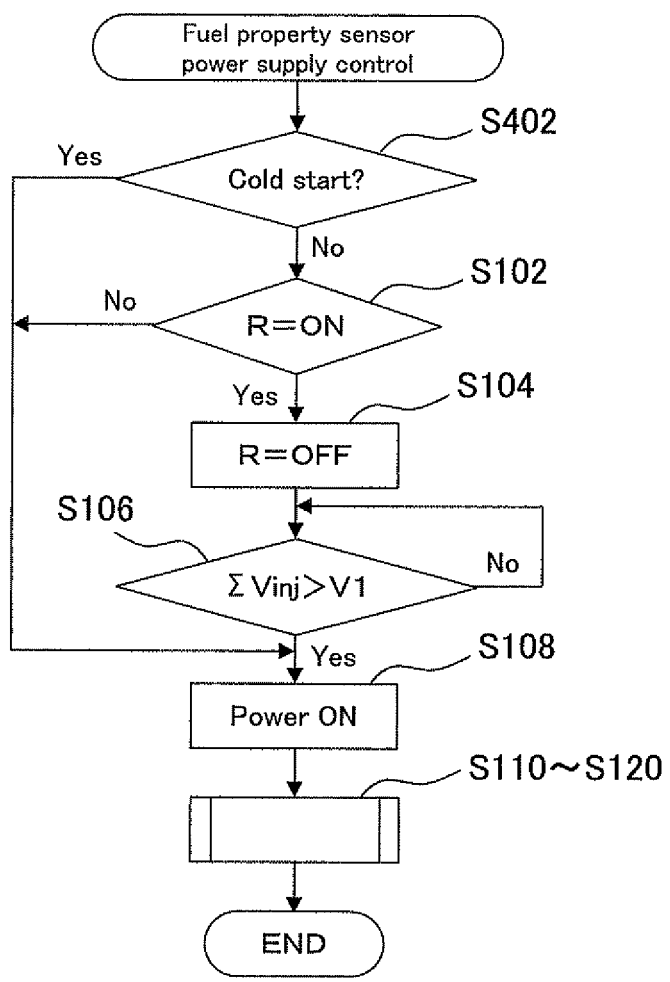
FIG. 6 is a flow chart showing a power supply control procedure performed in a fourth embodiment of the present invention.

FIG. 6 shows, in a flow chart, a power supply control procedure performed in this embodiment. Of operations shown in this flow chart, those found in common with the first embodiment are identified by like step numbers. The procedure shown in this flow chart is performed when the internal combustion engine is started, specifically, when a start switch of the internal combustion engine, for example, an ignition switch is turned ON.

In step S402, the first step, it is determined whether or not the current start is the cold start. The cold start can be determined with water temperature. If, for example, the water temperature is equal to or less than 0° C., the current start is determined to be the cold start. When the current start is the cold start, the operation skips steps S102, S104, and S106 to proceed to step S108. Specifically, the fuel property sensor 2 is immediately activated.

When the current start is not the cold start, the same operation as in the first embodiment is performed. After the activation, the operation of each of steps from step S110 to S120 is performed as in the first embodiment.

In the power supply control of the fuel property sensor 2 described above, during the cold start, the fuel property sensor 2 is activated to thereby start determining the fuel property as soon as the internal combustion engine is started. This allows the control to respond to changes in the fuel property resulting from quick replacement of fuel.

Fifth Embodiment

Finally, a fifth embodiment of the present invention will be described below with reference to FIG. 7.

A fuel property determining apparatus of this embodiment is applied to the vehicular fuel supply system having the configuration as shown in FIG. 1 as in the first embodiment. The description that follows is, therefore, based on the system shown in FIG. 1 as in the first embodiment.

The fuel property determining apparatus of this embodiment is characterized, as in the third and fourth embodiments, in that the power supply control of a fuel property sensor 2 is performed in terms of ensuring control accuracy of the air-fuel ratio to be achieved by an accurate determination of the fuel property. This embodiment, however, focuses on the control accuracy of the air-fuel ratio after the internal combustion engine is left to stand for a long period of time. If a blended fuel such as the ethanol-blended gasoline is used for the internal combustion engine, the blended fuel can be separated in the fuel tank 4 or the fuel pipe 6 while the internal combustion engine remains stationary. If the fuel is separated, the fuel property changes partially, even if the fuel property of the entire system is constant. With the ethanol-blended gasoline, for example, the separation causes the ethanol concentration to be uneven. In such cases, the property of the fuel actually supplied to the injectors 10 is different from that determined in the preceding trip even if the determination is made. The power supply control according to this embodiment therefore gives priority to the control accuracy of the air-fuel ratio over the power consumption and starts determining the fuel property immediately after the start of the internal combustion engine, in a case where the current start is performed after a long period of time during which the internal combustion engine is left to stand.

FIG. 7 shows, in a flow chart, a power supply control procedure performed in this embodiment. Of operations shown in this flow chart, those found in common with the first embodiment are identified by like step numbers. The procedure shown in this flow chart is performed when the internal combustion engine is started, specifically, when a start switch of the internal combustion engine, for example, an ignition switch is turned ON.

In step S502, the first step, it is determined whether or not the internal combustion engine has been left to stand for a long period of time since the preceding trip. For example, a timer may be used to measure the stationary time and it is determined that the internal combustion engine has been left to stand for a long period of time, when the stationary time up to the current start exceeds a reference time. The reference time depends on a separation speed of the fuel, and a value of which may be experimentally confirmed. When the internal combustion engine has been left to stand for a long period of time, the operation skips steps S102, S104, and S106 to proceed to step S108. Specifically, the fuel property sensor 2 is immediately activated.

When the internal combustion engine has not been left to stand for long, the same operation as in the first embodiment is performed. Additionally, after the activation, the operation of each of steps from step S110 to S120 is performed as in the first embodiment.

In the power supply control of the fuel property sensor 2 described above, when the internal combustion engine has been left to stand for a long period of time, the fuel property sensor 2 is activated to thereby start determining the fuel property as soon as the internal combustion engine is started. This allows the control to respond to changes in the fuel property with time.

Miscellaneous

Although the foregoing describes the exemplary preferred embodiments, the present invention is not limited to the above-described embodiments. Various changes in form and detail may be made therein without departing from the spirit and scope of the invention. For example, the above-described embodiments may be changed as follows.

In the above-described embodiments, the period of time through which the sum of the amount of fuel consumed in the internal combustion engine after the start of the internal combustion engine reaches a reference value is defined as the wait time before the activation. The wait time may, however, be set by another method. For example, a physical quantity having a correlation with the sum of the amount of fuel consumed in the internal combustion engine (e.g. a speed and an intake air amount) may be measured to serve as a basis for setting the wait time. In addition, an idle operation extending for some time may very often follow the start. With reference to the fuel consumption per unit time during the idle operation, therefore, time to be taken for fuel in the fuel tank 4 to reach the mounting position of the fuel property sensor 2 is calculated and the calculated time may be used as the wait time. Specifically, the wait time before the activation may be a fixed value.

In the above-described embodiments, an ethanol concentration sensor is used as the fuel property sensor 2. The specific type of sensor to be used may still be determined according to the type of fuel used. When, for example, the quality of gasoline used in the gasoline engine varies widely, a sensor that determines whether the fuel is heavy or light or one that detects an octane number may be used as the fuel property sensor 2.

The characteristic point of the power supply control according to the third embodiment can be combined with the power supply control according to the second embodiment. Additionally, the characteristic point of the power supply control according to the fourth embodiment can be combined with the power supply control according to the second embodiment and that according to the third embodiment. Further, the characteristic point of the power supply control according to the fifth embodiment can be combined with the power supply control according to the second embodiment, that according to the third embodiment, and that according to the fourth embodiment.

DESCRIPTION OF REFERENCE NUMERALS

2 Fuel property sensor
4 Fuel tank

6 Fuel pipe
8 Fuel pump
10 Injector
12 ECU
14 DC power supply
16 Switch

The invention claimed is:

1. A vehicular fuel property determining apparatus comprising:
   a fuel property sensor disposed on a fuel supply path extending from a fuel tank to an internal combustion engine;
   a switch for receiving an enable signal for activation and activating the fuel property sensor;
   means for determining a property of fuel supplied to the internal combustion engine based on a signal from the fuel property sensor;
   means for storing determination made of the fuel property;
   means for determining, at a start of the internal combustion engine, whether or not determination is made of the fuel property in a preceding trip; and
   means for transmitting the enable signal after waiting for a short period of time after the start of the internal combustion engine when it is determined that the determination of the fuel property is made in the preceding trip, and transmitting the enable signal immediately after the start of the internal combustion engine when it is determined that the determination of the fuel property is not made in the preceding trip.

2. The vehicular fuel property determining apparatus according to claim 1,
   wherein the short period of time is a period of time during which a sum of an amount of fuel consumed in the internal combustion engine reaches a predetermined value after the start of the internal combustion engine.

3. The vehicular fuel property determining apparatus according to claim 1,
   wherein the short period of time is a period of time required for fuel in the fuel tank to reach a mounting position of the fuel property sensor after the start of the internal combustion engine.

4. The vehicular fuel property determining apparatus according to claim 1, further comprising:
   means for terminating determination of the fuel property, when there is no change in the signal from the fuel property sensor for a predetermined period of time; and
   means for stopping activation of the fuel property sensor, when determination of the fuel property is terminated.

5. The vehicular fuel property determining apparatus according to claim 1, further comprising:
   means for detecting fluctuations in an air-fuel ratio exceeding a permissible range based on a parameter value having a correlation with the air-fuel ratio; and
   means for transmitting the enable signal when fluctuations in the air-fuel ratio exceeding the permissible range are detected.

6. The vehicular fuel property determining apparatus according to claim 1, further comprising:
   means for measuring a representative temperature that represents temperature of the internal combustion engine; and
   means for transmitting the enable signal immediately after the start of the internal combustion engine, when the representative temperature at the start of the internal combustion engine is equal to or less than a predetermined temperature.

7. The vehicular fuel property determining apparatus according to claim 1, characterized by further comprising:
   means for measuring a stationary time of the internal combustion engine since the preceding trip; and
   means for transmitting the enable signal immediately after the start of the internal combustion engine, when the stationary time up to a current start exceeds a predetermined time.

8. A vehicular fuel property determining apparatus comprising:
   a fuel property sensor disposed on a fuel supply path extending from a fuel tank to an internal combustion engine;
   a switch for receiving an enable signal for activation and activating the fuel property sensor;
   means for determining a property of fuel supplied to the internal combustion engine based on a signal from the fuel property sensor;
   means for storing determination made of the fuel property;
   means for determining, at a start of the internal combustion engine, whether or not determination is made of the fuel property in a preceding trip;
   means for transmitting a refueling signal when refueling of the fuel tank is performed and stopping transmitting the refueling signal when the determination of the fuel property is made; and
   means for transmitting the enable signal immediately after the start of the internal combustion engine when, at the start of the internal combustion engine, the refueling signal is detected and it is determined that the determination of the fuel property is not made in the preceding trip, and transmitting the enable signal after waiting for a short period of time after the start of the internal combustion engine, when the refueling signal is detected but it is determined that the determination of the fuel property is made in the preceding trip, and when the refueling signal not detected.

9. The vehicular fuel property determining apparatus according to claim 8,
   wherein the short period of time is a period of time during which a sum of an amount of fuel consumed in the internal combustion engine reaches a predetermined value after the start of the internal combustion engine.

10. The vehicular fuel property determining apparatus according to claim 8,
    wherein the short period of time is a period of time required for fuel in the fuel tank to reach a mounting position of the fuel property sensor after the start of the internal combustion engine.

11. The vehicular fuel property determining apparatus according to claim 8, further comprising:
    means for terminating determination of the fuel property, when there is no change in the signal from the fuel property sensor for a predetermined period of time; and
    means for stopping activation of the fuel property sensor, when determination of the fuel property is terminated.

12. The vehicular fuel property determining apparatus according to claim 8, further comprising:
    means for detecting fluctuations in an air-fuel ratio exceeding a permissible range based on a parameter value having a correlation with the air-fuel ratio; and
    means for transmitting the enable signal when fluctuations in the air-fuel ratio exceeding the permissible range are detected.

13. The vehicular fuel property determining apparatus according to claim 8, further comprising:

means for measuring a representative temperature that represents temperature of the internal combustion engine; and means for transmitting the enable signal immediately after the start of the internal combustion engine, when the representative temperature at the start of the internal combustion engine is equal to or less than a predetermined temperature.

14. The vehicular fuel property determining apparatus according to claim 8, characterized by further comprising:

means for measuring a stationary time of the internal combustion engine since the preceding trip; and means for transmitting the enable signal immediately after the start of the internal combustion engine, when the stationary time up to a current start exceeds a predetermined time.

15. A vehicular fuel property determining apparatus comprising:

a fuel property sensor disposed on a fuel supply path extending from a fuel tank to an internal combustion engine;

a switch for receiving an enable signal for activation and activating the fuel property sensor;

a unit for determining a property of fuel supplied to the internal combustion engine based on a signal from the fuel property sensor;

a unit for storing determination made of the fuel property;

a unit for determining, at a start of the internal combustion engine, whether or not determination is made of the fuel property in a preceding trip; and a unit for transmitting the enable signal after waiting for a short period of time after the start of the internal combustion engine when it is determined that the determination of the fuel property is made in the preceding trip, and transmitting the enable signal immediately after the start of the internal combustion engine when it is determined that the determination of the fuel property is not made in the preceding trip.

16. A vehicular fuel property determining apparatus comprising:

a fuel property sensor disposed on a fuel supply path extending from a fuel tank to an internal combustion engine;

a switch for receiving an enable signal for activation and activating the fuel property sensor;

a unit for determining a property of fuel supplied to the internal combustion engine based on a signal from the fuel property sensor;

a unit for storing determination made of the fuel property;

a unit for determining, at a start of the internal combustion engine, whether or not determination is made of the fuel property in a preceding trip;

a unit for transmitting a refueling signal when refueling of the fuel tank is performed and stopping transmitting the refueling signal when the determination of the fuel property is made; and a unit for transmitting the enable signal immediately after the start of the internal combustion engine when, at the start of the internal combustion engine, the refueling signal is detected and it is determined that the determination of the fuel property is not made in the preceding trip, and transmitting the enable signal after waiting for a short period of time after the start of the internal combustion engine, when the refueling signal is detected but it is determined that the determination of the fuel property is made in the preceding trip, and when the refueling signal not detected.

\* \* \* \* \*